United States Patent
Frank et al.

(10) Patent No.: US 9,878,642 B2
(45) Date of Patent: Jan. 30, 2018

(54) SAFETY BELT CLIP

(71) Applicant: Britax Römer Kindersicherheit GmbH, Ulm (DE)

(72) Inventors: Richard Frank, Elchingen (DE); Martin Haas, Steinheim (DE); Thorsten Scheffold, Ulm (DE)

(73) Assignee: BRITAX RÖMER KINDERSICHERHEIT GMBH, Leipheim (DE)

( * ) Notice: Subject to any disclaimer, the term of this patent is extended or adjusted under 35 U.S.C. 154(b) by 0 days.

(21) Appl. No.: 14/964,663

(22) Filed: Dec. 10, 2015

(65) Prior Publication Data

US 2016/0167548 A1   Jun. 16, 2016

(30) Foreign Application Priority Data

Dec. 10, 2014   (EP) .................................... 14004159

(51) Int. Cl.
*B60N 2/28* (2006.01)
*B60N 2/26* (2006.01)

(52) U.S. Cl.
CPC .......... *B60N 2/2812* (2013.01); *B60N 2/265* (2013.01); *B60N 2002/2818* (2013.01)

(58) Field of Classification Search
CPC .................. B60N 2/2812; B60N 2/265; B60N 2002/2815; B60N 2002/2818; B60R 22/105; B60R 2022/1818; B60R 22/28
See application file for complete search history.

(56) References Cited

U.S. PATENT DOCUMENTS

| | | | | |
|---|---|---|---|---|
| 5,257,854 | A | * | 11/1993 | Korneliussen .......... B60R 22/02 297/467 |
| 5,624,136 | A | * | 4/1997 | McGlothlin ............ B60R 22/02 280/801.1 |
| 5,673,969 | A | * | 10/1997 | Frazier ................. B60N 2/2806 297/256.15 |

(Continued)

FOREIGN PATENT DOCUMENTS

| | | |
|---|---|---|
| AU | 199867999 B2 * | 11/1998 |
| AU | 728869 B2 | 1/2001 |

(Continued)

OTHER PUBLICATIONS

Extended Search Report and Written Opinion of corresponding European application No. 14004159.1 dated May 22, 2015.

*Primary Examiner* — Philip F Gabler
(74) *Attorney, Agent, or Firm* — McNair Law Firm, P.A.

(57) ABSTRACT

The present invention relates to a safety belt clip (1) that is adapted to be coupled to a seat base (110) of a child safety seat (100) and to engage with a lap portion (10a) of a safety belt (10). The safety belt clip (1) comprises a guiding element (2) comprising an engaging element (2a) and a positioning component (2b). The positioning component (2b) is adapted to position the engaging element (2a) at a distance from the seat base (110) and the engaging element (2a) is adapted to engage with the lap portion (10a) of the safety belt (10). Furthermore, the guiding element (2) is configured to drive the lap portion (10a) of the safety belt (10) towards the pelvic region (230) of an occupant (200) secured in the child safety seat (100) with the safety belt (10).

20 Claims, 11 Drawing Sheets

(56) References Cited

U.S. PATENT DOCUMENTS

| | | | |
|---|---|---|---|
| 6,517,163 B2* | 2/2003 | Herrmann | B60R 22/02 297/253 |
| 2002/0109391 A1* | 8/2002 | Shie | B60N 2/2812 297/467 |
| 2003/0197415 A1 | 10/2003 | Dingman et al. | |
| 2013/0341993 A1* | 12/2013 | Kennington | B60R 22/105 297/464 |

FOREIGN PATENT DOCUMENTS

| | | |
|---|---|---|
| AU | 2013100483 B4 | 5/2013 |
| CN | 101489827 A | 7/2009 |
| CN | 202294667 U | 7/2012 |
| EP | 1623892 A1 | 2/2006 |
| WO | 2007103641 A1 | 9/2007 |

* cited by examiner

SAFETY BELT CLIP

The invention relates to a safety belt clip for use with a child safety seat. In particular, the invention relates to a safety belt clip for driving the lap portion of a safety belt towards the pelvic region of an occupant of the child safety seat in order to avoid abdominal intrusion of the lap portion, and for allowing release of the lap portion from the safety belt clip by a single operation. Furthermore, the safety belt clip of the invention improves the restraint performance of the restraint system used for securing the occupant.

Child safety seats can either be used with an integral harness system or in connection with the safety belts of a vehicle for restraining a child in the child safety seat. According to ECE Regulation no. 44, child safety seats which use means directly connected to the vehicle, such as adult seat belts, for restraining the child, fall into the so-called non-integral class.

Since safety belts are designed to fit the size of adults, child safety seats of the non-integral class are required for lifting the children to a certain height such that the safety belt fits the body of the child. In particular, when a three-point belt is used, such a child safety seat supports a firm positioning of the shoulder portion of the safety belt across the collar bone and the chest. Moreover, the lap portion of the safety belt is fitted to the hips and the pelvic region.

In the case of an accident, an improperly positioned safety belt may cause severe injuries of the child safety seat's occupant. In particular, if the shoulder portion of the safety belt is not positioned across the collar bone and the chest, it may cause injuries in the occupant's neck region. On the other hand, due to mal-positioning or simply because of the child's wriggling or slumping during a journey, the lap portion of the safety belt may sit on the abdomen of the child rather than across his or her hips and pelvic region. Moreover, the size or stature of the occupant may be such that the lap portion of the safety belt is driven into the abdominal region in the event of an accident.

The bony pelvis possesses a high resistance to external load. Such external load may be exerted by forces arising in a car accident. In such an event, it is, therefore, of uttermost importance that the lap portion of the safety belt is positioned in the pelvic region. If the child's pelvis slides under the lap portion, the lap portion of the safety belt intrudes the abdominal region. This effect is known as submarining. In the abdominal region, much less resistance counters the external load as compared to the pelvic region. This may cause serious internal injuries.

In order to reduce the risk of submarining AU 728869 B2 describes a child safety seat which is used in connection with an adult seat belt for securing the child comprising an auxiliary strap secured to the seat body. The auxiliary strap extends between the legs of an occupant of the child safety seat. The strap is coupled to a hook which may be engaged round a lap portion of the safety belt. This combination of the auxiliary strap and the hook has, however, several disadvantages. First, the construction is unstable: the slack auxiliary strap connected to the hook allows for a large mobility of the hook. Second, the described construction requires several operations to engage the lap portion of the safety belt at buckling or to disengage the lap portion at unbuckling of the safety belt with the vehicle: since the slack auxiliary strap is not adapted to support the hook at the height of the upper surface of the child's legs, two hands are required to engage the lap portion with or disengage the lap portion from the hook. In other words, one hand is needed to hold the hook in a position such that the lap portion can be inserted with the other hand into the hook.

Another solution to mitigate the risk of submarining is described in AU 2013100483 B4. There, a belt guide for a lap portion of a safety belt is formed into an upper face of the seat base of a child safety seat of the kind that is used in connection with an adult seat belt for securing the child. The belt guide is a rigid tab located between the legs of the child extending from and above the upper face of the seat base so as to be defining a slot. Beneath the belt guide the lap portion of the child safety seat can be passed so that the lap portion is held close to the upper face of the seat base. This causes the lap portion to be wrapped closely over the child's thighs. One disadvantage of this belt guide is its cumbersome handling. Since the rigid tab is positioned close to the upper surface of the seat base, an extra effort has to be applied for engaging or disengaging the lap portion of the safety belt with or from the belt guide.

The easy handling of safety belt clips is crucial: according to several regulations, such as ECE Regulation no. 44 or the GB standard in China, it must be possible to release the child from the child safety seat by a single operation on a single buckle. With the previously presented solutions this might not be the case. Therefore, these solutions may not be approved in countries that apply such regulations.

It is, thus, an object of the present invention to provide a safety belt clip for guiding the lap portion of a safety belt that avoids abdominal intrusion of the lap portion of the safety belt, and that allows for the release of the lap portion from the safety belt clip by a single operation.

This object is achieved by the safety belt clip according to claim 1 and by the child safety seat according to claim 14. Further advantageous embodiments of the present invention are indicated in claims 2 to 13 and 15.

According to a first aspect of the invention there is provided a safety belt clip adapted to be coupled to a seat base of a child safety seat and to engage with a lap portion of a safety belt. The safety belt clip comprises a guiding element comprising an engaging element and a positioning component. The positioning component is adapted to position the engaging element at a distance from the seat base, and the engaging element is adapted to engage with the lap portion of the safety belt. The guiding element is configured to drive the lap portion of the safety belt towards the pelvic region of an occupant secured in the child safety seat with the safety belt. Since the guiding element is configured to drive the lap portion of the safety belt towards the pelvic region of the occupant, it is ensured that the lap portion of the safety belt is positioned well below the occupant's abdomen. Therefore, it is avoided that the occupant's pelvis slides beneath the lap portion of the safety belt. The risk that the lap portion of the safety belt intrudes the abdominal region is, thus, reduced. Since the positioning component is adapted to position the engaging element at a distance from the seat base, the lap portion of the safety belt does not substantially dip into the occupant's crotch region. This has the advantage that the lap portion does not get stuck between the legs of the occupant. Because of this, the lap portion of the safety belt can be released from the safety belt clip by a single operation upon unbuckling of the safety belt. Advantageously, the guiding element is further configured to guide the lap portion of the safety belt substantially horizontally over the thighs of the occupant. Preferably, the section of the lap portion of the safety belt located between the occupant's thighs does not diverge by more than 10 mm from the plane defined by the upper surfaces of the occupant's thighs. In particular, the center of this section of the lap portion of the safety belt might be positioned up to 10 mm below the plane defined by the upper surfaces of the occupant's thighs, resulting in a very slight "v"-shape of this section of the lap portion. Consequently, a pinching or clamping of the lap portion between the legs is further suppressed. Advantageously, the guiding element possesses a certain rigidity. This gives the guiding element and, as a consequence, the safety belt clip a higher stability. Preferably, the guiding element is produced of plastic. Preferably, the positioning component possesses a rigidity adapted to support the engaging element. It is further preferable if the engaging element and the positioning component are integrally formed. This increases the stability of the safety belt clip. In particular, this feature guarantees that the guiding element is self-supporting.

Advantageously, the positioning component is configured to be resiliently coupled to the seat base of the child safety seat so as to force the engaging element towards the occupant's pelvic region. This has the advantage of maintaining the lap portion of the safety belt in a position well below the occupant's abdomen during a journey. Even in the case the occupant is wriggling or slumping while being seated in the child safety seat, the lap portion of the safety belt stays positioned such as to prevent submarining. As a further advantage, the safety belt clip accommodates to the position of the occupant secured in the child safety seat. Because of this, it can be avoided that the safety belt clip pushes too strongly against the occupant's crotch region.

Advantageously, the engaging element comprises a hook adapted to hook into the lap portion of the safety belt. Preferably, the hook comprises a tongue and a back portion defining a channel between the tongue and the back portion, wherein the channel is adapted to guide the lap portion of the safety belt. Advantageously, the tongue possesses a rounded shape configured to avoid jamming of the lap portion of the safety belt in the channel upon unbuckling of the safety belt. Preferably, the rounded shape possesses the form of a semi-circle, a triangle with rounded corners, a rectangle with rounded corners, or a trapezoid with rounded corners. The hook has the advantage that the lap portion of the safety belt is securely engaged with the guiding element. The hook ensures that the lap portion of the buckled safety belt does not unexpectedly release from the engaging element during a journey. The rounded shape of the tongue of the hook has the advantage of supporting the release of the lap portion of the safety belt from the hook upon unbuckling. This ensures the release of the occupant by a single operation. In this case, the lap portion slides off the hook more easily upon unbuckling of the safety seat. Therefore, the safety belt can be retracted by use of a single hand only. Without a rounded shape of the tongue the lap portion of the safety belt could easily get caught in the channel of the hook after unbuckling of the safety belt.

Advantageously, the positioning component comprises a shaft. Preferably, the shaft is elongated. In this case, the space occupied by the guiding element between the legs of the occupant can be limited. In particular, the guiding element does not cause indentations on the occupant's legs. Advantageously, the positioning component is configured to be resilient. Preferably, the positioning component possesses an elastic modulus adapted to force the engaging element towards the occupant's pelvic region. Preferably the positioning component comprises an elastic material, plastic, spring steel sheets, seal strips, and/or elastic steel ropes. Furthermore, the resilient positioning component is preferably configured to ensure that the engaging element is driven towards the pelvic region of the occupant. The resilience of the positioning component has the advantage that the safety belt adapts to the position of the occupant secured in the child safety seat. It is, thus, avoided that the lap portion of the safety belt rides loosely over the occupant's abdomen. The lap portion of the safety belt guided through the engaging element is, thus, positioned below the abdomen of the occupant during an entire journey. This prevents submarining.

Advantageously, the safety belt clip further comprises a resilient element that is engaged with the positioning component. Preferably the resilient element comprises a spring, a leg spring, spring steel sheets, seal strips, and/or elastic steel ropes. This achieves the same advantages as described in the previous paragraph.

Advantageously, the safety belt clip comprises a coupling element configured to rotatably couple the safety belt clip to the seat base of the child safety seat. Advantageously, the coupling element possesses an elasticity adapted to rotate or tilt the guiding element, when coupled to the child safety seat, against the force of the resilient element. Preferably, the coupling element comprises a steel rope, spring steel sheets, seal strips and/or spring-loaded elements. As a result of such a coupling element the safety belt clip can be rotated so as to facilitate the placing of the occupant into the child safety seat. Advantageously, the coupling element is configured to removably couple the safety belt clip to the seat base of the child safety seat. Due to this, the safety belt clip may be used with child safety seats that are adapted for both babies and older children, such as group 1-2-3 child safety seats according to the ECE Regulation no. 44 or similar child safety seats. The safety belt clip can be attached to or removed from the child safety seat depending on whether the child is secured by the integral safety harness or by an adult seat belt.

Advantageously, the distance of the engaging element from the seat base is adjustable. This allows for a height adjustment of the safety belt clip. Advantageously, the distance is adjustable up to approximately 40 mm, preferably up to 30 mm. Because of this, the distance of the engaging element of the safety belt clip from the seat base can be varied up to 40 mm, preferably up to 30 mm, between a retracted and an extended position. This makes sure that the safety belt clip can be used in connection with child safety seats configured for children in a wide range of ages, preferably child safety seats of group 2 or group 3 according to the classification of ECE Regulation no. 44 or in comparable child safety seats. Because of the adjustable distance it can be ensured that the lap portion of the safety belt is guided substantially horizontally over the thighs of the occupant independently of his or her age. Preferably, the distance of the engaging element is adjustable by a rotatable eccentric height adjusting element configured to engage with the coupling element. This allows for an easy handling of the height adjustment.

Advantageously, the safety belt clip further comprises an energy absorbing element configured to be deformed in the event of a crash. Preferably, the energy absorbing element is connected to the coupling element or somewhere else in the load path. Preferably, the energy absorbing element comprises a spring. Advantageously, the spring possesses a large damping coefficient. Preferably, the energy absorbing element comprises a block of a plastic material. Advantageously, the block possesses a high friction coefficient. Advantageously, the energy absorbing element is connected to the seat base of the child safety seat. Preferably, the energy absorbing element is given by a part defined by a pull linkage of the seat base itself configured to be plastically deformed in the event of a crash. Because of the plastic deformation of the energy absorbing element a portion of the impact energy acting on the occupant in the case of a crash dissipates. In the case of a spring, the deformation is the tensioning of the spring. Energy is dissipated because of the friction related to the damping coefficient. In the case of a block of plastic material, at least a part of the kinetic energy of an accelerated occupant is absorbed because of the work performed by the deformation of the block of the plastic material and/or the work performed against the friction. Therefore, the energy absorbing element damps the forces exerted on the occupant. Advantageously, the stroke of the energy absorbing element is limited. Therefore, despite the energy absorbing element the distance traveled by the safety belt clip under load is limited. In particular, the distance traveled by the guiding element in the case of an accident is limited. Because of this, abdominal al intrusion of the lap portion of the safety belt is avoided. This reduces the risk of serious injuries of the occupant in the event of a crash.

Preferably, the guiding element comprises a belt ejection mechanism configured to automatically eject the lap portion of the safety belt from the engaging element upon unbuckling of the safety belt. Preferably, the belt ejection mechanism is installed in the engaging element of the guiding element. Advantageously, the belt ejection mechanism comprises a spring-loaded element, such as a spiral spring. The spring-loaded element is tensioned under the load of the lap portion of the safety belt when fastened. When the safety belt is unbuckled, the spring-loaded element is restored to its rest position. The restoration force of the spring-loaded element ejects the lap portion of the safety belt from the engaging element. The belt ejection mechanism avoids, thus, the jamming of the lap portion of the safety belt in the engaging element. It ensures that the lap portion of the safety belt is released from the engaging element upon unbuckling.

According to another aspect of the present invention there is provided a child safety seat configured to secure an occupant seated in the child safety seat with a safety belt of a vehicle, comprising a seat base and a safety belt clip of the invention, wherein the safety belt clip is coupled to the seat base of the child safety seat. Preferably, the child safety seat is classified according to group 1, group 2, group 3, group 2-3, or group 1-2-3 of ECE Regulation no. 44, or the child safety seat is a respective comparable child safety seat. In particular, the child safety seat may be a booster cushion. That is a firm cushion, which can be used with an adult seat belt. Preferably, the child safety seat is adapted for children aged between 3.5 and twelve years. The child safety seat according to the invention has the same advantages as described previously in relation to the safety belt clip of the invention. In particular, the child safety seat of the invention prevents the occupant from submarining. Advantageously, the safety belt clip is positioned between the legs of the occupant. In this case, the safety belt clip restrains the occupant in addition to the safety belt of the vehicle. The safety belt clip prevents the occupant from slipping out of the child safety seat beneath the lap portion of the safety belt.

Specific embodiments of the invention will now be described by way of example and with reference to the accompanying drawings, in which:

FIG. 3b is a sectional side view of the elements shown in FIG. 3a;

Figure 1:
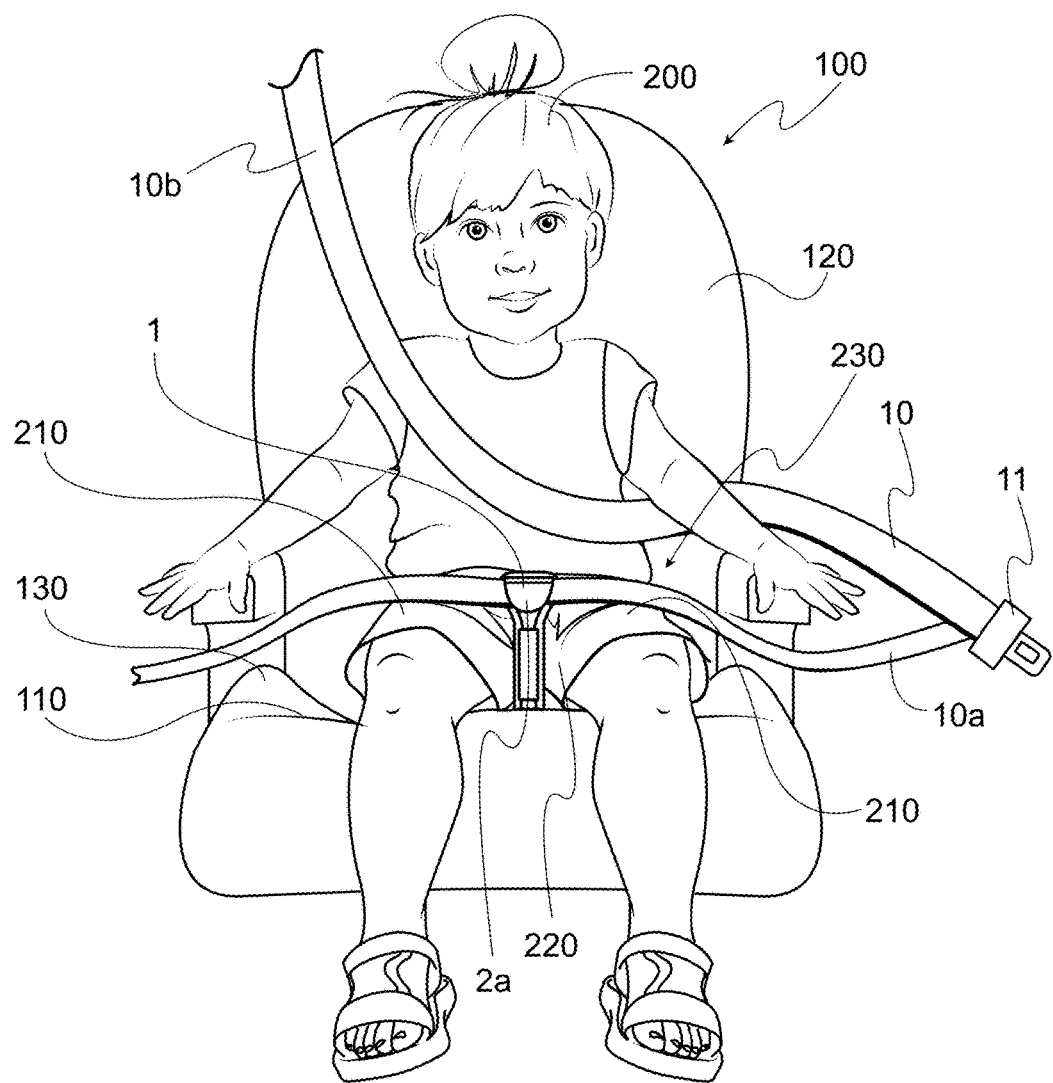
FIG. 1 shows a child safety seat according to the invention with a child occupant secured therein.

FIG. 1 shows a child safety seat 100 equipped with a safety belt clip 1 in accordance with the invention. The child safety seat 100 shown in FIG. 1 is intended for use in combination with the safety belts 10 of a vehicle. The depicted child safety seat 100 comprises a seat base 110 and a backrest 120. The seat base 110 and the backrest 120 may be separately or integrally formed. Furthermore, an occupant 200 is sketched which is secured with a safety belt 10 to the child safety seat 100. FIG. 1 explains the general idea of the use and functioning of the safety belt clip 1 in combination with a child safety seat 100 in accordance with the invention.

In the empty child safety seat 100, the safety belt clip 1 projects substantially vertically from the seat base 110 of the child safety seat 100. Before placing the occupant 200 into the child safety seat 100, the safety belt clip 1 is preferably tilted towards the seat base 110 and away from the backrest 120. This facilitates the placing of the occupant 200 into the child safety seat 100. Once the occupant 200 is placed in the child safety seat 100, the safety belt clip 1 is rotated back to its substantially vertical position. Then, the safety belt 10 is guided over the occupant's body and fastened into the buckle of the vehicle. The lap portion 10a of the safety belt 10 is hooked into the engaging element 2a of the safety belt clip 1. The engaging of the lap portion 10a with the engaging element 2a can be done manually after fastening the safety belt 10. It is also possible that the lap portion 10a is guided into the engaging element 2a of the safety belt clip 1 already during the fastening of the occupant 200. In this case, no additional operation is necessary for engaging the lap portion 10a with the safety belt clip 1. Upon unbuckling, the safety belt 10 can be retracted by a single hand movement to its fully retracted position. The lap portion 10a slides off the engaging element 2a during the retraction of the safety belt 10. The safety belt clip 1 of the invention is designed so that the lap portion 10a of the safety belt 10 does not get caught in the engaging element 2a after unbuckling. Once the safety belt 10 is fully retracted, the safety belt clip 1 can be tilted away from the occupant 200. This facilitates the exiting of the occupant 200 from the child safety seat 1.

Shown in FIG. 1 is a three-point seat belt 10. The safety belt 10 comprises a lap portion 10a and a shoulder portion 10b. The shoulder portion 10b as shown is correctly guided over the shoulder of the occupant 200. Both the lap portion 10a and the shoulder portion 10b are guided through a tongue 11. The tongue 11 can be buckled to a buckle connected to the vehicle. FIG. 1 shows that the lap portion 10a of the safety belt 10 is guided through the safety belt clip 1. It will become more evident from the description of the following Figures that a section of the lap portion 10a of the safety belt 10 is received by an engaging element 2a of a guiding element of the safety belt clip 1. Preferably, the safety belt 10 is further guided through belt guides of the child safety seat (belt guides 112 in FIGS. 6a, 6b, but not shown here). The belt guides drive the lap portion of the safety seat towards the hips and the pelvic region of the occupant 200.

The seat base 110 and backrest 120 are preferably covered by a padded seat cover 130. The child safety seat 100 may comprise more components than shown in FIG. 1, such as a head rest or arm rests. The child safety seat 100 may also comprise less components, such as for booster cushions. The safety belt clip 1 is coupled to the seat base 110 of the child safety seat 100. The coupling element is not visible in FIG. 1 because it is located beneath the cover 130. The coupling element will be described in relation to the following Figures. The safety belt clip 1 projects upwardly from the seat base 110 of the child safety seat 100. In FIG. 1 the safety belt clip 1 extends nearly vertically from the seat base 110. The safety belt clip 1 is positioned between the legs of the occupant. It is positioned such that it is close to the crotch region 220 of the occupant 200. As will be described in further detail below in relation to FIGS. 2a and 2b a resilient element comprised by the safety belt clip 1 drives the safety belt clip 1 further towards the occupant's pelvic region 230. This supports the correct positioning of the lap portion 10a of the safety belt 10.

The distance of the engaging element 2a of the safety belt clip 1 from the seat base 110 is such that the lap portion 10a of the safety belt 10 is guided over the thighs 210 of the occupant 200. Moreover, the lap portion 10a of the safety belt 10 is guided substantially horizontally over the thighs 210. This can be achieved by positioning the engaging element 2a in the plane defined by the upper surfaces of the occupant's thighs 210. The position of the engaging element 2a is such that the lap portion 10a of the safety belt 10 is not distinctly dipped into the crotch region 220 of the occupant 200. The safety belt clip 1 ensures that the lap portion 10a of the safety belt 10 is in close contact with the thighs 210.

When viewed from the front, the parts of the lap portion 10a of the safety belt 10 guided over the thighs 210 of the occupant 200 together with the safety belt clip 1 are arranged in the form of the letter "T". This arrangement allows for a release of the lap portion 10a of the safety belt 10 from the safety belt clip 1 by a single operation after unbuckling. Since the lap portion 10a of the safety belt 10 is guided substantially horizontally over the occupant's thighs 210, it may be avoided that the lap portion 10a gets stuck or clamped between the legs of the occupant 200 after unbuckling of the safety belt 10. Moreover, the release by a single operation is also supported by the particular shape of the engagement element 2a that will be described in more detail in relation to FIG. 2a. The safety belt clip 1 positioned in the crotch region 220 of the occupant 200 further prevents the occupant 200 from sliding with its pelvic region 230 beneath the lap portion 10a of the safety belt 10 during an accident. This minimizes the risk of the so-called submarining.

So far, the use of the safety belt clip 1 has been described in relation to child safety seats that use the safety belts 10 of a vehicle for restraining the occupant 200. The safety belt clip 1 of the invention can, however, also be used in connection with other child safety seats, such as child safety seats of group 1, group 2, group 3 of ECE Regulation no. 44. Preferably, the safety belt clip 1 is used with group 2-3 or group 1-2-3 child safety seats. Furthermore, the use with prams or strollers is also possible.

Figure 2:
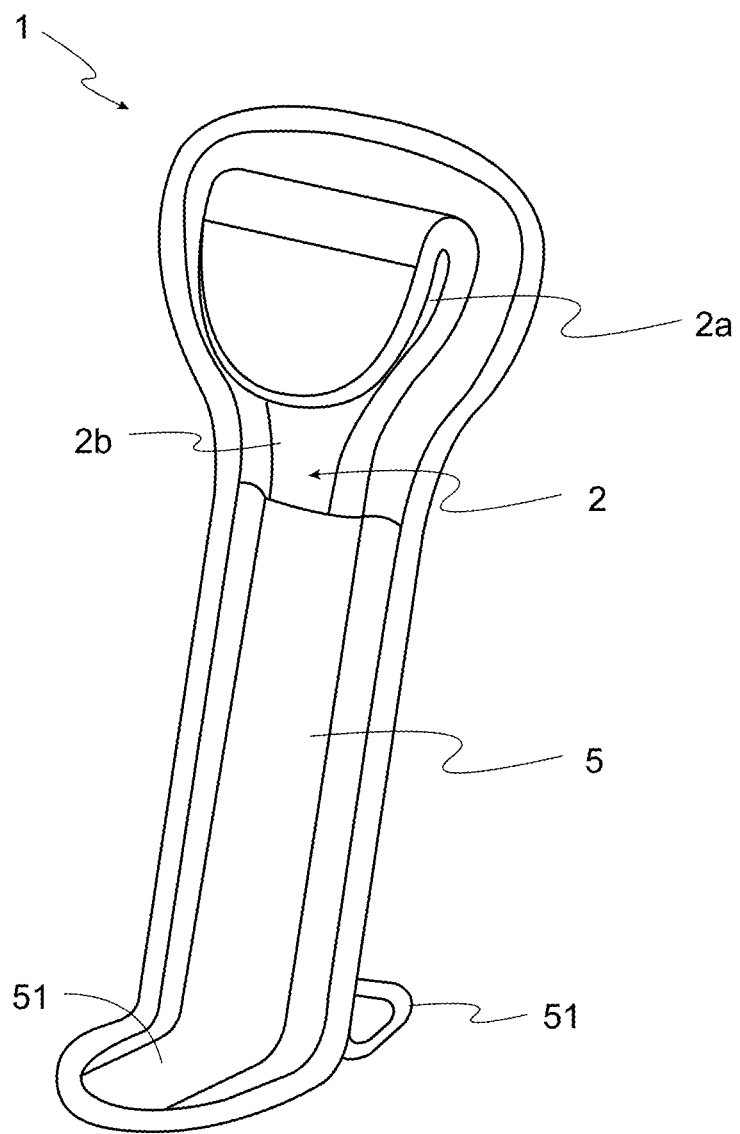
FIG. 2 shows a perspective view of a safety belt clip in accordance with the invention.

FIG. 2 shows a fully assembled safety belt clip 1 according to the present invention. In FIG. 2 there are visible the engaging element 2a, a part of the positioning component 2b, and the cover 5. The cover 5 comprises a pedestal 51. The pedestal 51 is formed by two flaps of the cover 5. The flaps of the pedestal 51 are placed at the lower end of the safety belt clip 1. One of the flaps points away from the front side of the safety belt clip 1. The other flap points away from the back side of the safety belt clip 1. The pedestal 51 gives the safety belt clip 1 stability. Preferably, the pedestal 51 comprises a reinforcing element, such as a rope, a steel sheet, or a plastic sheet, which further stabilizes the pedestal 51. As will be described in relation to FIG. 6b, the pedestal 51 allows for a stable installation of the safety belt clip 1 on the seat base of the child safety seat. Preferably, the cover 5 is padded or cushioned. The padded or cushioned cover 5 prevents the occupant of the child safety seat from getting in contact with the resilient element and the coupling element of the safety belt clip 1. Further, the padded or cushioned cover 5 increases the comfort for the occupant when the safety belt clip 1 is tilted towards and when it touches the occupant's pelvic region. Moreover, in case of an accident, the padded or cushioned cover 5 may absorb a certain amount of the impact energy. In the case of, e.g., a frontal impact the occupant is not pressed directly against the guiding element 2 but against the padded or cushioned cover 5. Therefore, the padded or cushioned cover 5 may serve as a buffer that absorbs a part of the energy of the displacement of the occupant in the child safety seat. The padded or cushioned cover 5 serves, thus, as an additional protection means.

Figure 3A:
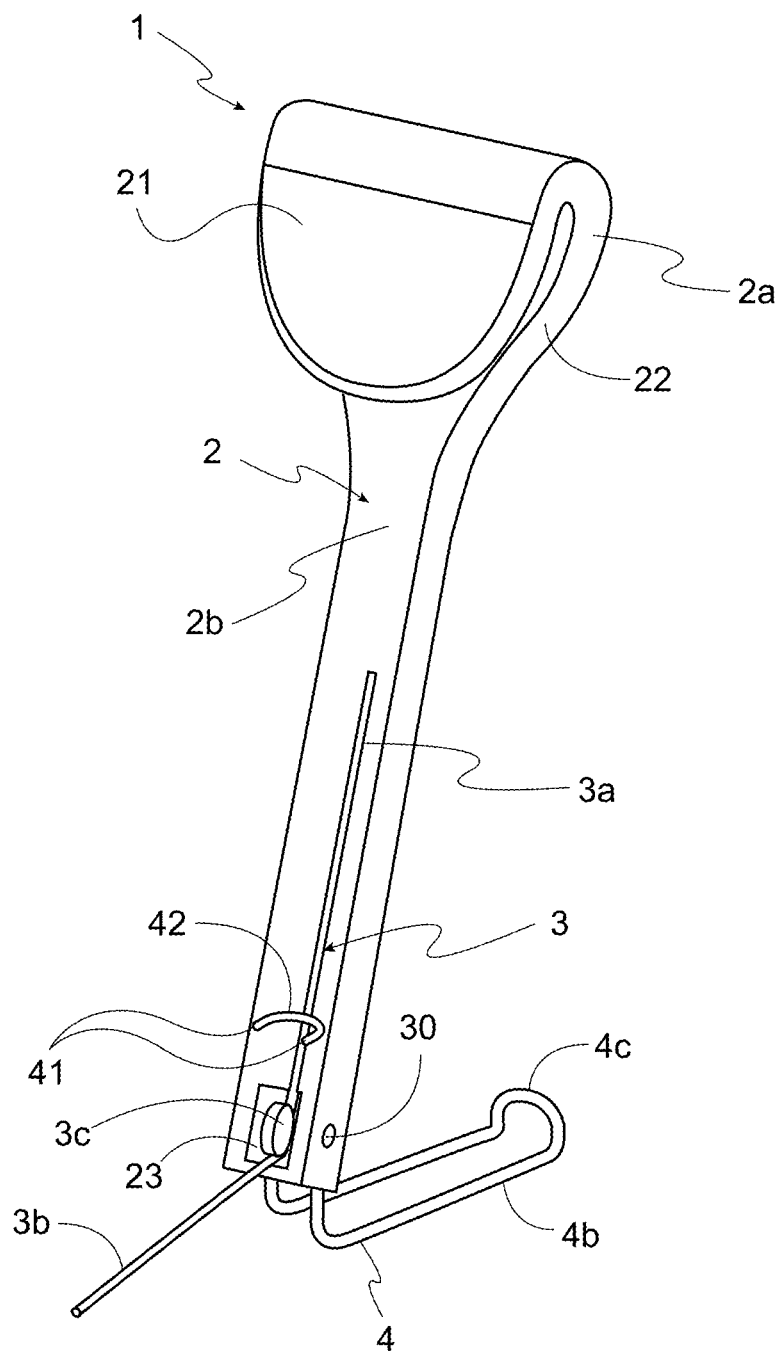
FIG. 3a shows a perspective view of a guiding element, a resilient element and a coupling element of a safety belt clip according to the invention.

FIG. 3a shows a perspective view of the guiding element 2, the resilient element 3, and the coupling element 4 of a safety belt clip 1 in accordance with the invention. The safety belt clip 1 preferably corresponds to the safety belt clip 1 described in relation with FIG. 2 when the padded or cushioned cover 5 is removed.

In the shown embodiment, the resilient element 3 is a leg spring. The coupling element 4 is a loop of steel rope. The leg spring 3 is connected with the guiding element 2. The leg spring 3 is connected with an axis pin 30 to the guiding element 2. The coupling element 4 serves to fix the safety belt clip 1 on the seat base of the child safety seat. The coupling element 4 is connected with the guiding element 2. When installed on the child safety seat, the coupling element 4 allows for rotation of the safety belt clip 1 relative to the seat base. This will be explained in more detail in relation to FIGS. 6a and 6b below.

The guiding element 2 comprises an engaging element 2a and a positioning component 2b. The positioning component 2b has the form of a shaft. It is elongated and extends into the engaging element 2a. The engaging element 2a is a hook. The hook 2a of the embodiment shown in FIG. 3a comprises a tongue 21 and a back portion 22. The shape of the hook 2a is rounded. In particular, the tongue 21 has a semi-circular shape. The height of the tongue 21 of the hook 2a is chosen such as to be adapted to securely hook a section of the lap portion 10a of a safety belt 10 into the hook 2a. It is, however, not necessary for the tongue 21 to be at least as high as the width of the lap portion 10a of the safety belt 10. Advantageously, the height of the tongue 21 ranges between 40% and 70% of the width of the lap portion 10a.

In the shown embodiment the engaging element 2a and the positioning component 2b are integrally formed. In other embodiments, it is also possible that the engaging element 2a and the positioning component 2b are separately produced, and afterwards assembled to form the guiding element 2 in accordance with the invention.

The leg spring 3 comprises two legs 3a, 3b and a winding 3c. The winding 3c is embedded into a recess 23 in the guiding element 2. The leg 3a is nestled to the positioning component 2b of the guiding element 2. The leg 3b protrudes from the guiding element 2. As will be explained below in relation to FIGS. 6a and 6b, the leg 3b is coupled to the seat base of the child safety seat for forcing the safety belt clip 1 towards the occupant's pelvic region. The leg spring 3 is connected with the positioning component 2b by an axis pin 30 that extends through the winding 3c. The rest configuration of the leg spring 3 is chosen such that, when installed on the seat base of a child safety seat, the positioning component 2b is tilted towards the occupant's pelvic region. When being deflected from the rest configuration, e.g., during the placement of an occupant into the child safety seat, the leg spring 3 ensures that the guiding element 2 is restored automatically to its optimal functional position.

For the shown embodiment of the safety belt clip 1 the coupling element 4 is given by a loop of steel rope. It is shown that the horizontal part 4b of the coupling element 4 extends into an apex 4c that is approximately orthogonal to the horizontal part 4b. It is also possible that the apex 4c of the coupling element 4 lies in the same plane as the horizontal parts 4b. The coupling element 4 is guided through holes 41 in the guiding element 2. This leads to a fixation of the coupling element 4 with the guiding element 2. The portion 42 of the coupling element 4 pinches the leg 3a of the leg spring 3 to the positioning component 2b. This ensures that the leg spring 3 is kept in functional position. Different ways of connecting the coupling element 4 to the guiding element 2 are possible. Instead of guiding the coupling element 4 through the holes 41 of the guiding element 2, the coupling element 4 can be fixed on the back side of the guiding element 2. Such a fixation means will be described in more detail below in connection with FIG. 5. It is also possible to fix the leg 3a of the leg spring 3 by separate pinching elements 42, such as pins.

Figure 3B:
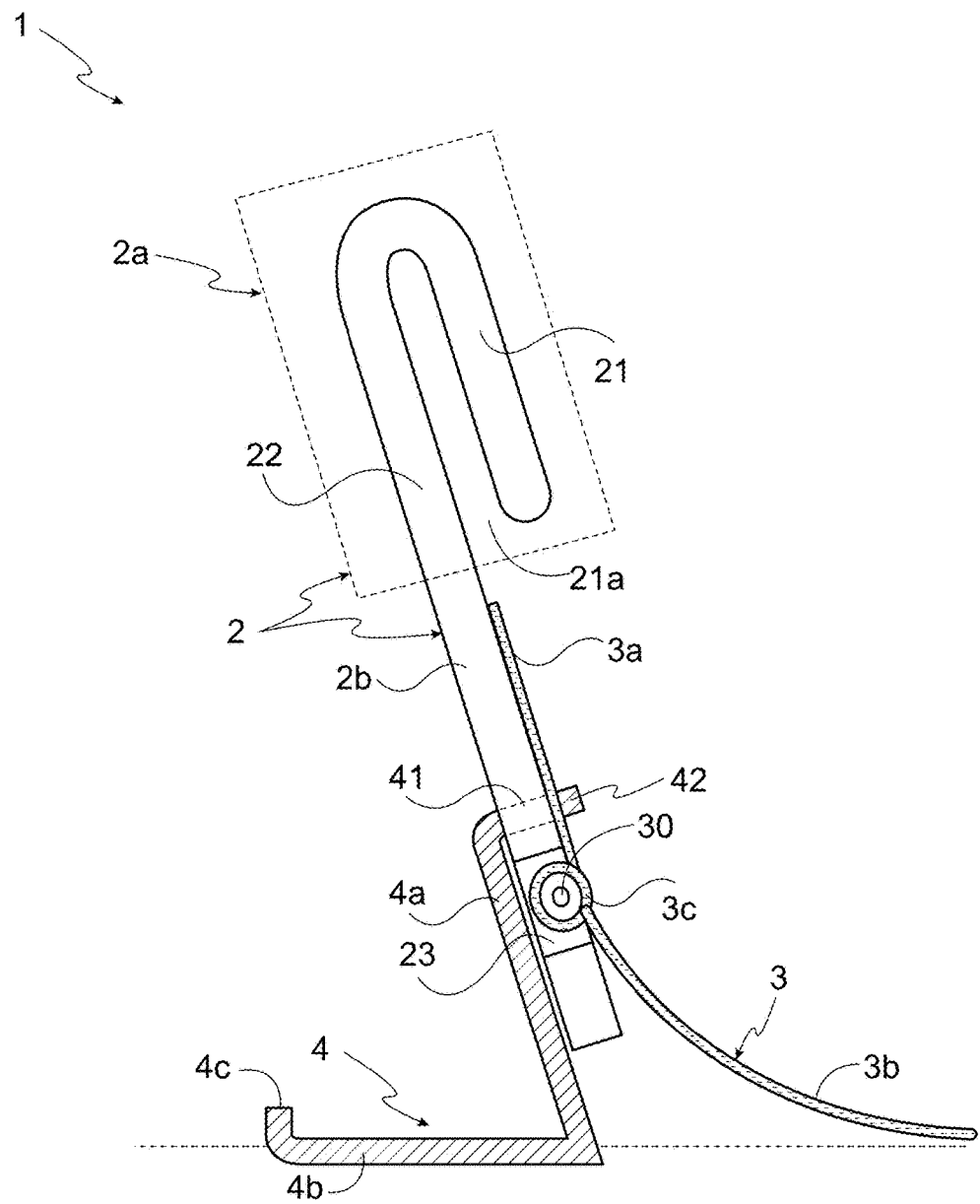

FIG. 3b shows a sectional view of the safety belt clip 1 depicted in FIG. 3a viewed from the side. The guiding element 2, the resilient element 3 and the coupling element 4 are the same as described above in relation to FIG. 3a. As it is manifest from FIG. 3b, the hook 2a possesses a U-shaped cross-section. Further, between the tongue 21 and the back portion 22 there extends a channel 21a. In this channel 21a a section of the lap portion ma of the safety belt 10 can be received. The holes 41 configured to guide the coupling element 4 through the guiding element 2 are indicated by dashed lines.

FIG. 3b further shows that the leg spring 3 is connected with an axis pin 30 to the guiding element 2. The axis pin 30 extends through the winding 3c of the leg spring 3. The winding 3c is embedded in a recess 23 in the positioning component 2b.

It is shown in FIG. 3b that the coupling element 4 comprises a part 4a that is nestled to the back of the positioning component 2b, and a horizontal part 4b configured to be coupled to the seat base of a child safety seat. The coupling element 4 advantageously possesses a certain elasticity. On the one hand, the coupling element 4 stabilizes and supports the guiding element 2. On the other hand, the coupling element 4 allows for rotation of the guiding element 2. In particular, the coupling element 4 allows for restoration of the guiding element 2 by the leg spring 3 back to its rest configuration when deflected from the rest configuration.

Figure 4A:
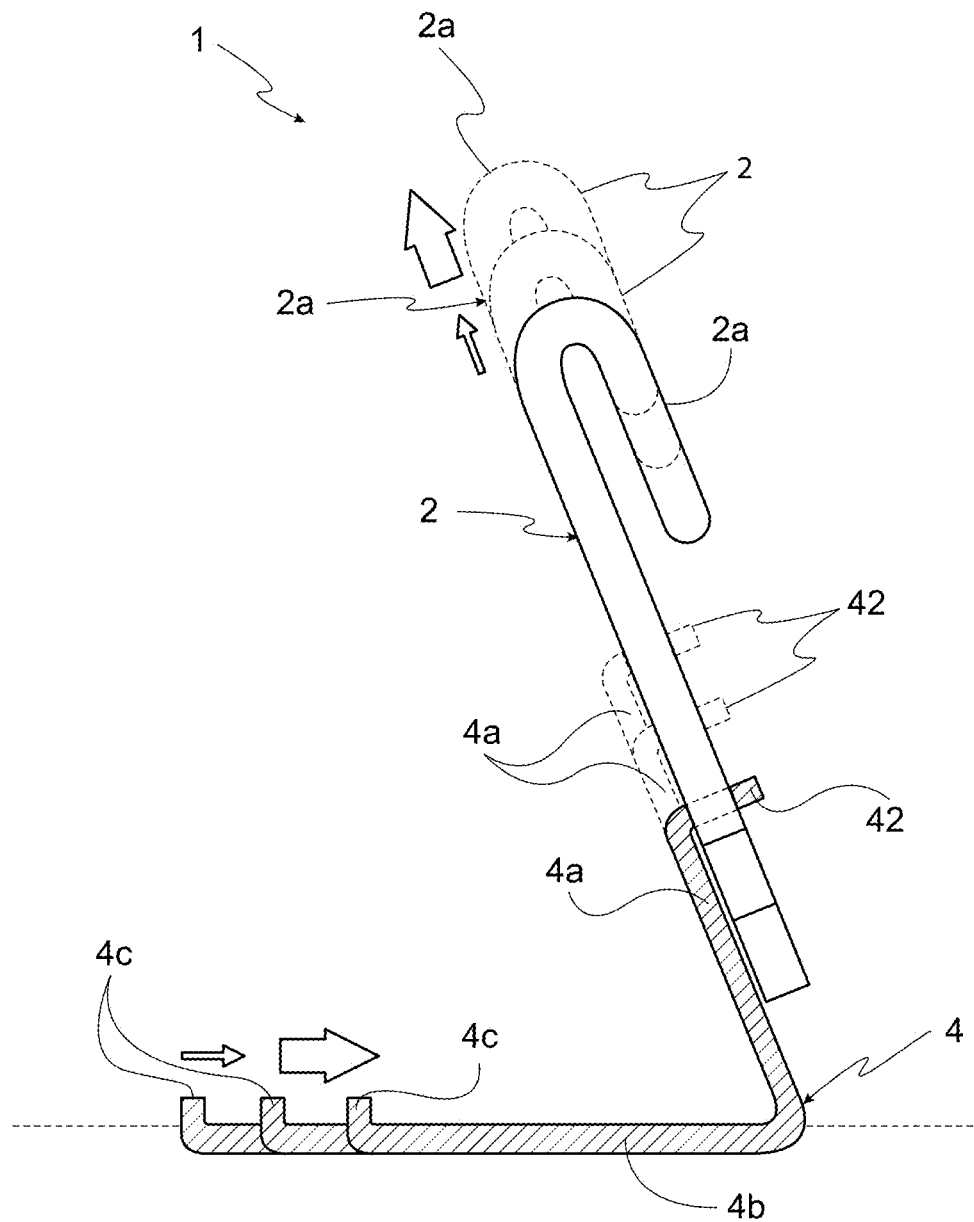
FIG. 4a shows a safety belt clip in accordance with the invention equipped with a loop of steel rope for adjusting the height of the safety belt clip.

FIG. 4a shows an alternative embodiment of the safety belt clip 1 in accordance with the invention. This safety belt clip 1 differs from the safety belt clip 1 described with respect to FIGS. 2, 3a and 3b in that it has an adjustable height. This means that the distance of the engaging element 2a from the seat base is adjustable. There are shown a guiding element 2, comprising the engaging element 2a, and a coupling element 4. The guiding element 2 is shown at three different heights (solid line, dashed line, dashed-dotted line). The corresponding positions of the coupling element 4 are also indicated by the respective solid, dashed, and dashed-dotted line. Preferably, the coupling element 4 is constituted by a loop of steel rope. The part 4a of the coupling element 4 is connected to the guiding element 2, for instance by using pinching elements 42 as described above in relation to FIG. 3a. The apex 4c of the guiding element 4 is adapted to be hooked into respective hooks or catches in the seat base of a child safety seat. For instance, each of two consecutive hooks or catches may be equidistant. By changing the hook or catch where the apex 4c is hooked into, the length of the part 4a projecting from the upper surface of the seat base, on the one hand, and the length of the horizontal part 4b beneath the seat base, vary. Consequently, the distance of the guiding element 2 from the seat base varies accordingly.

Although only the guiding element 2 and the coupling element 4 are shown with respect to FIG. 4a, it is understood that the safety belt clip 1 equipped with the described height adjusting mechanism may further comprise any of the elements described in relation to the child safety clip of FIGS. 2, 3a, and 3b.

Figure 4B:
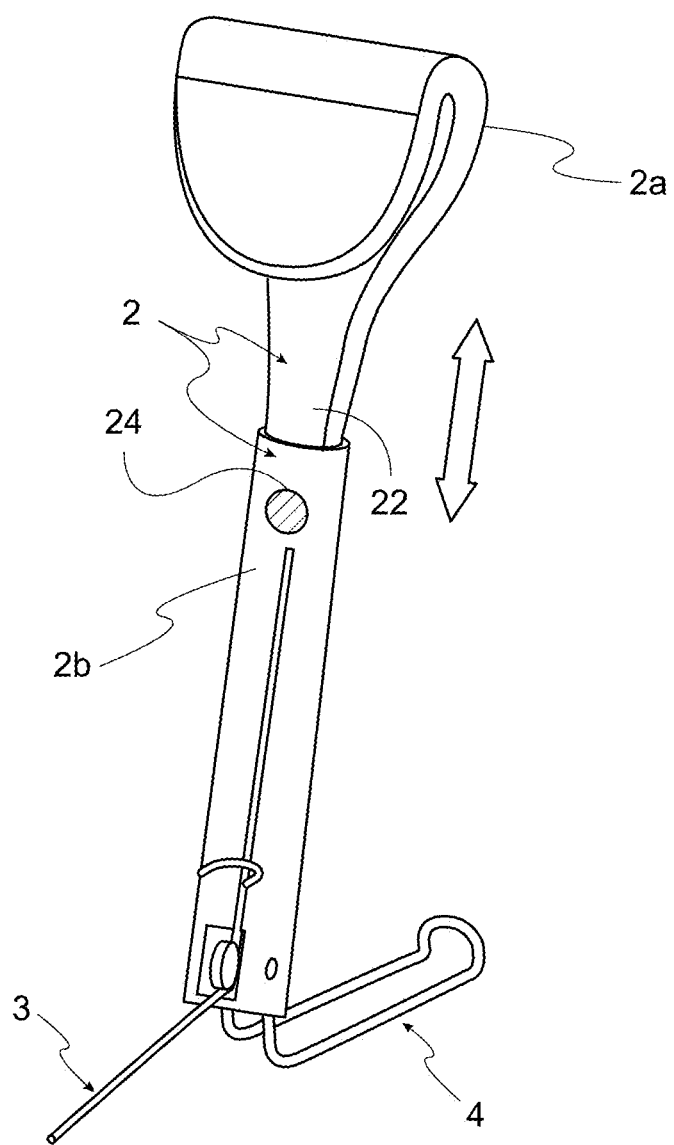
FIG. 4b shows a safety belt clip in accordance with the invention equipped with a telescopic mechanism for adjusting the height of the safety belt clip.

FIG. 4b shows a further alternative embodiment of the safety belt clip 1 in accordance with the invention. This safety belt clip 1 differs from the safety belt clip 1 described with respect to FIGS. 2, 3a and 3b in that it uses a telescopic mechanism for adjusting the height of the safety belt clip 1. FIG. 4b shows the guiding element 2, the resilient element 3 and the coupling element 4 of the safety belt clip 1. The hook 2a and the positioning component 2b are non-integrally formed. According to this embodiment, the hook 2a is nested in the positioning component 2b of the guiding element 2. Preferably, the back portion 22 of the hook 2a is nested in a recess of the positioning component 2b. This allows the hook 2a and the positioning component 2b to form a telescopic mechanism. The recess of the positioning component 2b is designed such as to receive and/or guide at least a part of the back portion 22 of the hook 2a. The hook 2a can be extended from a retracted position to an extended position. This allows for varying the length of the guiding element 2, and, thus, for varying the height of the safety belt clip 1.

In order to fix the length of the guiding element 2, a locking mechanism (not shown) may be included. The button 24 unlocks the locking mechanism upon pressing. The locking mechanism may be a bar or a latch that engages the hook 2a with the positioning component 2b when locked. When pressing the button 24, the bar or latch may disengage from the hook 2a allowing for a height adjustment of the guiding element 2. In another embodiment, the engaging element 2a and the positioning component 2b may be held in position simply by the frictional force between these two functional elements.

In another embodiment of the safety belt clip 1, instead of a telescopic mechanism as described in relation to FIG. 4*b*, a helical element may be used. Preferably, a screw in combination with a screw thread is used. The engaging element 2*a* and the positioning component 2*b* are non-integrally formed. The screw may be fixed to the engaging element 2*a*. The screw thread may be internal to the positioning component 2*b*. By turning the screw fixed to the engaging element 2*a* into the internal screw thread, the length of the guiding element 2 may be adjusted. This embodiment ensures an easy adjusting of the height of the safety belt clip 1. The heights may vary between a retracted and an extended position. It is sufficient to turn the engaging element 2*a* of the guiding element 2 once or more times for increasing or reducing the length of the guiding element 2.

Figure 5:
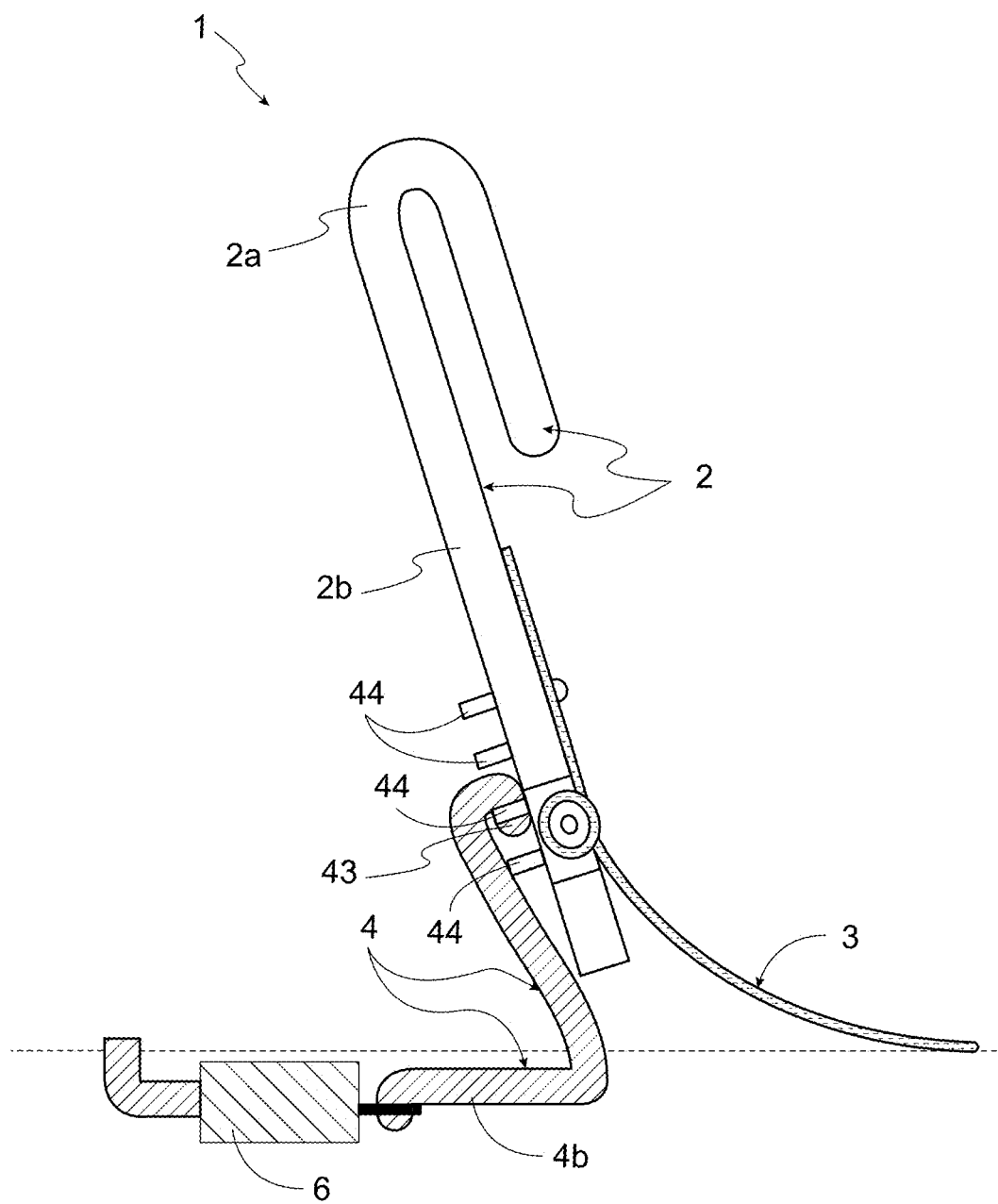
FIG. 5 shows a safety belt clip in accordance with the invention equipped with a ladder mechanism for adjusting the height of the safety belt clip together with an energy absorbing element.

FIG. 5 shows the sectional side view of a preferred embodiment of the safety belt clip 1 in accordance with the invention. As in the Figures before, FIG. 5 shows the guiding element 2, the resilient element 3 and the coupling element 4. In addition, an energy absorbing element 6 connected to the coupling element 4 is shown. The shown safety belt clip 1 has an adjustable height. The shown embodiment uses a ladder mechanism comprising a ladder of loops 44 each of which may engage with the hook 43 of the coupling element 4. In the shown embodiment the coupling element 4 possesses a hook 43 on the end engaging with the positioning component 2*b* of the guiding element 2. This hook 43 serves for fixing the coupling element 4 to the guiding element 2. The guiding element 2 has more than one loop 44 on the back side of the positioning component 2*b*. The guiding element 2 can be fixed at different heights by hooking the hook 43 into one of the loops 44. This embodiment allows for a stepwise increase of the height of the safety belt clip 1 depending on the loop 44 engaging with the hook 43. The uppermost loop 44 defines the retracted position. The lowermost loop 44 defines the extended position.

FIG. 5 further shows an energy absorbing element 6. The energy absorbing element 6 is connected to the coupling element 4 preferably to the horizontal part 4*b* of the coupling element 4. A force acting on the safety belt clip 1 is at least partially transferred to the energy absorbing element 6. For instance, in case of a frontal impact the occupant of the safety seat is accelerated in forward direction. Owing to this acceleration a force acts on the lap portion of the safety belt and on the guiding element 2 of the safety belt clip 1. The force acts, thus, also on the coupling element 4 and finally on the energy absorbing element 6.

The energy absorbing element 6 absorbs energy in the case of an impact. The energy absorption is achieved in that the energy absorbing element 6 deforms under the load exerted by the impact.

Figure 6A:
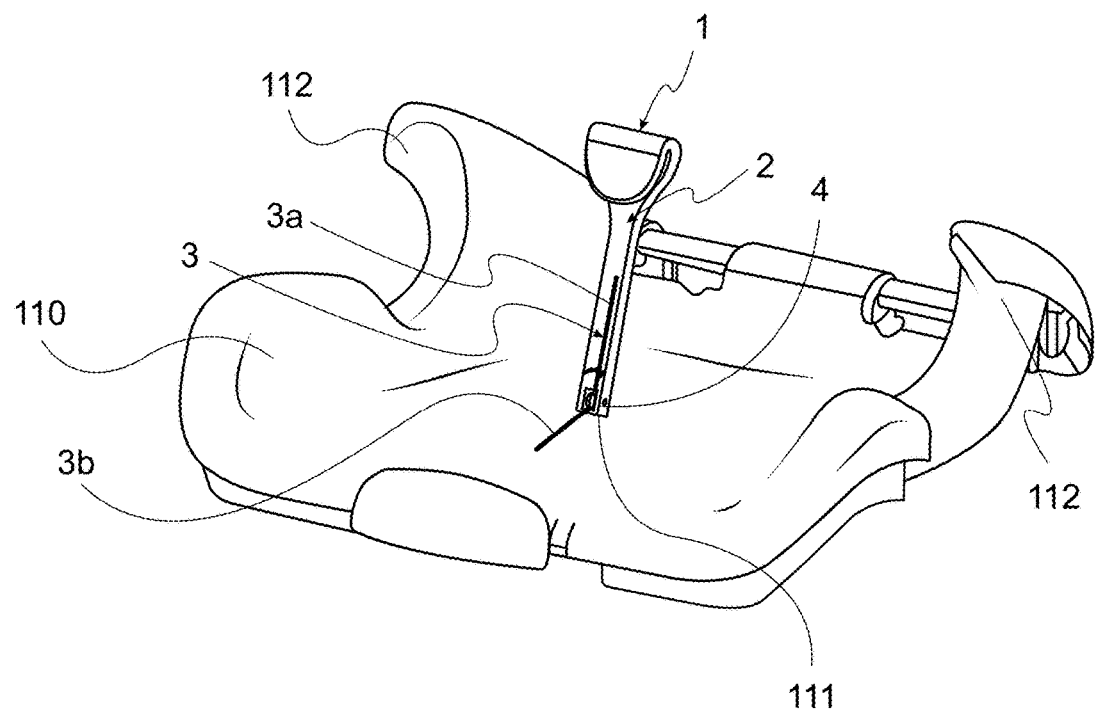
FIG. 6a shows the elements depicted in FIG. 3a coupled to the seat base of a child safety seat in accordance with the invention.

FIG. 6*a* shows a safety belt clip 1 coupled to the seat base 110 of a child safety seat in accordance with the invention. FIG. 6*a* shows the guiding element 2, the leg spring 3, and the coupling element 4 of the safety belt clip 1. The safety belt clip 1 projects approximately vertically from the seat base 110. The safety belt clip 1 is positioned such that it extends between the legs of an occupant.

The horizontal part (4*b*, as shown in FIG. 3*b*, but not visible here) of the coupling element 4 is guided through a slot 111 in the seat base 110. In this case the horizontal part of the coupling element 4 is connected to the lower surface of the seat base 110. It is also possible that the horizontal part of the coupling element 4 is connected to the upper surface of the seat base 110.

The coupling element 4 allows for rotation of the guiding element 2. The rotation can be performed forward and backward, to the left and the right, and around the guiding element's 2 longitudinal axis. The rotation into to forward direction is particularly advantageous during the placement of an occupant into the child safety seat. The hinge point for rotation in forward and backward direction is on the upper surface of the seat base 110 close to the slot 111.

The leg 3*b* of the leg spring 3 touches the upper surface of the seat base 110. The leg 3*a* is nestled to the guiding element 2. The position shown corresponds to the rest configuration of the leg spring 3. When the guiding element 2 is tilted into forward direction, the angle between the legs 3*a* and 3*b* decreases. This leads to a restoration force in the leg spring 3 forcing the guiding element 2 back to its rest configuration. The leg spring 3, thus, ensures that the lap portion 10*a* of the safety belt 10 is kept in its functional position for suppressing submarining.

In FIG. 6*a* there are also shown two belt guides 112. These belt guides 112 are formed as catches in the seat base 110 for receiving the lap portion of the safety belt. The belt guides 112 ensure, in addition to the safety belt clip 1, that the lap portion of the safety belt is guided over the hips and the pelvic region of the occupant. The risk for abdominal intrusion is, thus, further reduced.

When the preferred embodiment of the safety belt clip 1 described in relation to FIG. 5 is considered, then the horizontal part of the coupling element 4 is not directly connected to the seat base 110. In this case, the horizontal part of the coupling element 4 is connected to the energy absorbing element. The energy absorbing element may then be coupled or connected to the seat base 110.

Figure 6B:
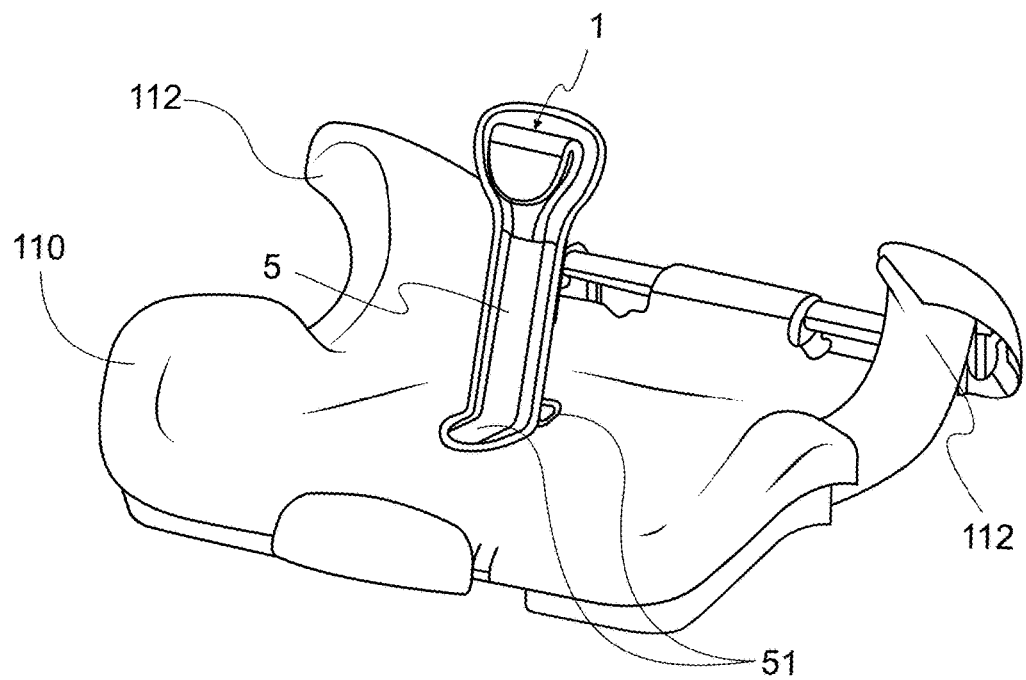
FIG. 6b shows a safety belt clip coupled to the seat base of a child safety seat in accordance with the invention.

FIG. 6*b* shows the safety belt clip 1 described in relation to FIG. 6*a* further comprising a padded or cushioned cover 5. The safety belt clip 1 preferably corresponds to the safety belt clip 1 described in relation to FIG. 2. The safety belt clip 1 is coupled to the seat base 110 of a child safety seat in accordance with the invention. The cover 5 comprises a pedestal 51 at the lower end of the safety belt clip 1. The pedestal 51 is formed by two flaps.

The pedestal 51 of the padded or cushioned cover 5 ensures the stability of the safety belt clip 1 once the seat base 110 is lined with the padded seat cover (130, as shown in FIG. 1, but not visible here). The pressure exerted by the padded seat cover pushes the flaps of pedestal 51 towards the seat base 110. As a consequence, the safety belt clip 1 is stabilized. In addition, the padded seat cover prevents the occupant from getting into contact with leg spring 3 and the coupling element 4 of the safety belt clip 1.

In order to avoid the automatic restoration of the guiding element 2 back to its rest configuration during the placement of an occupant into the child safety seat the padded or cushioned cover 5 of the safety belt clip 1 and the padded seat cover may comprise fixation means. Preferably, the padded or cushioned cover 5 and the padded seat cover comprise a Velcro fastener, a fastener button, or a button and a respective hole or loop. Thanks to the fixation means the guiding element 2 may be fixed in a highly tilted position. This highly tilted position preferably corresponds to a position substantially parallel to the seat base 110. It is particularly preferable if the guiding element 2 is kept in the position substantially parallel to the seat base 110.

FIGS. 6a and 6b show the safety belt clip 1 described in relation to FIGS. 2, 3a, and 3b. The coupling of the other discussed embodiments can be done analogously.

Figure 7A:
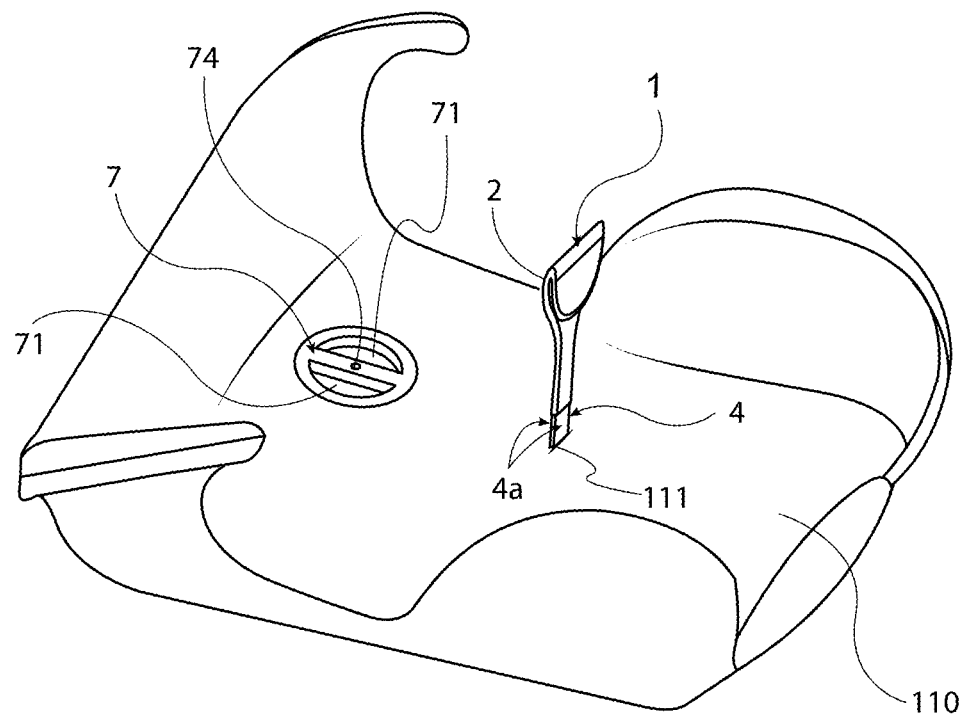
FIG. 7a shows an eccentric height adjusting element and a height adjustable safety belt clip coupled to the seat base of a child safety seat in accordance with the invention.
Figure 7B:
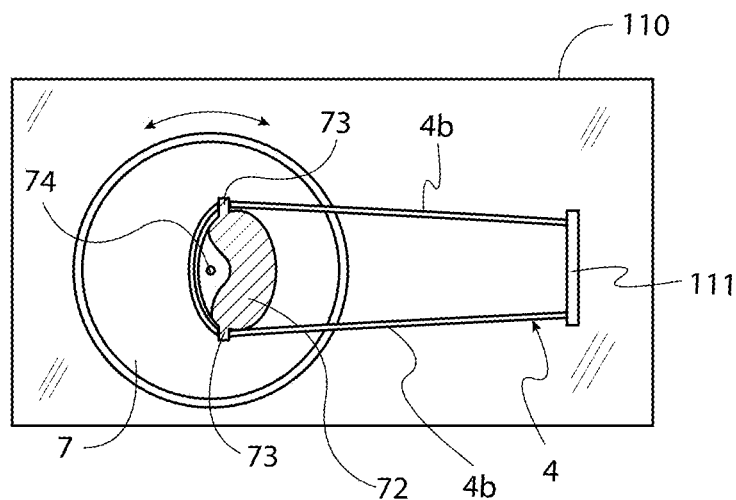
FIG. 7b shows a part of the lower surface of the seat base with the eccentric height adjusting element of FIG. 7a installed, in the case of a fully extended safety belt clip.
Figure 7C:
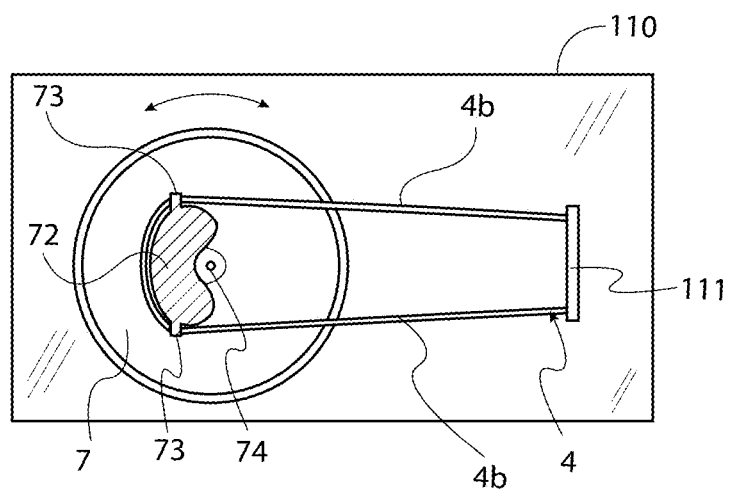
FIG. 7c shows a part of the lower surface of the seat base with the eccentric height adjusting element of FIG. 7a installed, in the case of a fully retracted safety belt clip.

FIG. 7a shows the seat base 110 of a child safety seat, a safety belt clip 1, a coupling element 4, and an eccentric height adjusting element 7. The eccentric height adjusting element 7 is installed in the seat base 110. Preferably, the safety belt clip 1 corresponds to the safety belt clip described in relation to FIGS. 2, 3a, and 3b. The eccentric height adjusting element 7 allows for height adjustment of the safety belt clip 1. The eccentric height adjusting element 7 is rotatable around its vertical central axis 74. By rotation of the eccentric height adjusting element 7 around its vertical central axis 74, the guiding element 2 of the safety belt clip 2 may vary between a maximally retracted and a maximally extended position. The coupling element is fixed to the guiding element 2 of the safety belt clip 1. Only the part 4a of the coupling element 4 nestled to the back of the guiding element 2 is visible. The part 4a is guided through the slot 111 in the seat base 110. The horizontal part (4b, as shown in FIGS. 7b, 7c, but not visible here) is guided beneath the seat base 110 so as to engage with the eccentric height adjusting element 7. The eccentric height adjusting element 7 has a circular shape. It possesses the form of a button. On the shown upper surface, the eccentric height adjusting element 7 features two indentations 71. Owing to these indentations 71, a grip is formed. This allows a user to rotate the eccentric height adjusting element 7.

FIG. 7b shows a view on a section of the lower surface of the seat base 110 comprising the installed eccentric height adjusting element 7. The coupling element 4 engages with the eccentric height adjusting element 7. The configuration shown in FIG. 7b corresponds to a maximally extended guiding element of a safety belt clip. The shown lower surface of the eccentric height adjusting element 7 comprises a bulge 72 and two catches 73. The bulge 72 provides the eccentricity of the eccentric height adjusting element 7. The shown bulge 72 has the form of a kidney-shaped plateau. The horizontal part 4b of the coupling element 4 is guided from the slot 111 of the seat base 110 to and around the bulge 72 of the eccentric height adjusting element 7 and back to the slot 111. The turning point of the horizontal part 4b is located close to the rotation axis 74, that is the center of the eccentric height adjusting element 7. Preferably, the horizontal part 4b of the coupling element 4 comprises a steel rope, such as a flexible steel rope. This ensures that the horizontal part 4b is adapted to be guided around the bulge 72. The two catches 73 ensure that the horizontal part 4b of the coupling element 4 does not disengage from the eccentric height adjusting element 7. The bulge 72 is closer to the slot 111 than the rotation axis 74. In the shown configuration the length of the horizontal part 4b of the coupling element 4 beneath the seat base 110 is, thus, minimal. This leads to a maximally extended guiding element of the safety belt clip.

FIG. 7c shows the same eccentric height adjusting element 7 as in FIG. 7b, but in a position that is rotated by an angle of 180° around the rotation axis 74. In this case, the bulge 72 is at a larger distance from the slot 111 of the seat base 110 as compared to the configuration shown in FIG. 7b. The horizontal part 4b of the coupling element 4 is guided from the slot 111 to and around the bulge 72 and back to the slot 111. In FIG. 7c the horizontal part 4b passes the bulge 72 further away from the slot 111 than the rotation axis 74. That is, the turning point of the horizontal part 4b is located in a peripheral area of the eccentric height adjusting element 7, remote from the slot 111. Therefore, in the shown configuration the length of the horizontal part 4b of the coupling element 4 beneath the seat base 110 is maximal. This corresponds to a maximally retracted guiding element of the safety belt clip.

By rotation of the eccentric height adjusting element 7 any position between the two extremal configurations shown in FIGS. 7b and 7c may be reached. This allows for a continuous adjusting of the height of the guiding element of the safety belt clip. The distance between the maximally retracted and the maximally extended position of the guiding element depends on the shape and size of the bulge 72.

LIST OF REFERENCE NUMERALS 1 safety belt clip
2 guiding element
2a engaging element/hook
2b positioning component
21 tongue of the hook 2a
22 back portion of the hook 2a
21a channel between tongue 21 and back portion 22 of the hook 2a
23 recess of the guiding element 2
24 button of the locking mechanism
3 resilient element/leg spring
3a, 3b legs of the leg spring 3
3c winding of the leg spring 3
30 axis pin
4 coupling element
4a part of the coupling element 4 nestled to the back of the guiding element 2
4b horizontal part of the coupling element 4
4c apex of the coupling element 4
41 holes in the guiding element 2 for guiding the coupling element 4
42 pinching element
43 hook of the coupling element 4
44 loops
5 padded or cushioned cover
51 pedestal of the padded or cushioned cover 5
6 energy absorbing element
7 eccentric height adjusting element
71 indentation of the eccentric height adjusting element 7
72 bulge of the eccentric height adjusting element 7
73 catch of the eccentric height adjusting element 7
74 rotation axis of the eccentric height adjusting element 7
10 safety belt
10a lap portion of the safety belt 10
10b shoulder portion of the safety belt 10
11 tongue of the safety belt 10
100 child safety seat
110 seat base of the child safety seat 100
111 slot of the seat base 110
120 backrest of the child safety seat 100
130 padded seat cover of the child safety seat 100
200 occupant
210 thighs of the occupant 200
220 crotch region of the occupant 200
230 pelvic region of the occupant 200

The invention claimed is:

1. A safety belt clip adapted to be coupled to a seat base of a child safety seat and to engage with a lap portion of a safety belt, the safety belt clip comprising:
   a guiding element comprising an engaging element and a positioning component, and
   a cover comprising a first side and a second side, wherein the positioning component is adapted to position the engaging element at a distance from the seat base;

wherein the engaging element is adapted to engage with the lap portion of the safety belt;

wherein the guiding element is configured to drive the lap portion of the safety belt towards the pelvic region of an occupant secured in the child safety seat with the safety belt;

wherein the first side of the cover is configured to be positioned between the guiding element and the occupant secured in the child safety seat; and wherein the second side of the cover is opposite the first side of the cover and is configured to cover a portion of the positioning component of the guiding element while leaving the engaging element exposed to enable the engaging element to engage with the lap portion of the safety belt.

2. The safety belt clip of claim 1, wherein the guiding element is further configured to guide the lap portion of the safety belt substantially horizontally over the thighs of the occupant.

3. The safety belt clip of claim 1, wherein the positioning component is configured to be resiliently coupled to the seat base of the child safety seat so as to force the engaging element towards the occupant's pelvic region.

4. The safety belt clip of claim 1, wherein the engaging element comprises a hook adapted to hook into the lap portion of the safety belt.

5. The safety belt clip of claim 4,
wherein the hook comprises a tongue and a back portion defining a channel therebetween adapted to guide the lap portion of the safety belt, and
wherein the tongue possesses a rounded shape configured to avoid jamming of the lap portion of the safety belt in the channel upon unbuckling of the safety belt.

6. The safety belt clip of claim 1, wherein the positioning component comprises a shaft.

7. The safety belt clip of claim 1, wherein the positioning component is configured to be resilient.

8. The safety belt clip of claim 1, further comprising a resilient element engaged with the positioning component.

9. The safety belt clip of claim 1, comprising a coupling element configured to rotatably or removably couple the safety belt clip to the seat base of the child safety seat.

10. The safety belt clip of claim 9, wherein the distance of the engaging element is adjustable by a rotatable eccentric height adjusting element configured to engage with the coupling element.

11. The safety belt clip of claim 1, wherein the distance of the engaging element from the seat base is configured to be adjustable.

12. The safety belt clip of claim 1, further comprising an energy absorbing element configured to be deformed in the event of a crash.

13. A child safety seat configured to secure an occupant seated in the child safety seat with a safety belt of a vehicle, comprising
a seat base; and
a safety belt clip;
wherein the safety belt clip is coupled to the seat base of the child safety seat and
wherein the safety belt clip comprises:
a guiding element comprising an engaging element and a positioning component, and
a cover comprising a first side and a second side,
wherein the positioning component is adapted to position the engaging element at a distance from the seat base;
wherein the engaging element is adapted to engage with a lap portion of the safety belt;
wherein the guiding element is configured to drive the lap portion of the safety belt towards a pelvic region of an occupant secured in the child safety seat with the safety belt;
wherein the first side of the cover is configured to be positioned between the guiding element and the occupant secured in the child safety seat; and
wherein the second side of the cover is opposite the first side of the cover and is configured to cover a portion of the positioning component of the guiding element while leaving the engaging element exposed to enable the engaging element to engage with the lap portion of the safety belt.

14. The child safety seat of claim 13, wherein the child safety seat is adapted for children aged between 3.5 and twelve years.

15. The child safety seat of claim 13, wherein the positioning component is rigidly configured such that the engaging element is positioned at a distance from the seat base.

16. The child safety seat of claim 13, wherein the cover is padded or cushioned.

17. The child safety seat of claim 13, wherein the first side and the second side of the cover each comprise a flap, wherein a pedestal is formed by the flap of each of the first side and the second side.

18. The safety belt clip of claim 1, wherein the positioning component is rigidly configured such that the engaging element is positioned at a distance from the seat base.

19. The safety belt clip of claim 1, wherein the cover is padded or cushioned.

20. The safety belt clip of claim 1, wherein the first side and the second side of the cover each comprise a flap, wherein a pedestal is formed by the flap of each of the first side and the second side.

* * * * *